(12) United States Patent
Kim et al.

(10) Patent No.: US 9,893,809 B2
(45) Date of Patent: Feb. 13, 2018

(54) APPARATUS AND METHOD FOR VISIBLE LIGHT COMMUNICATION USING ELECTRICALLY SWITCHABLE GLASS

(71) Applicant: Electronics and Telecommunications Research Institute, Daejeon (KR)

(72) Inventors: You-Jin Kim, Daejeon (KR); Dae-Ho Kim, Daejeon (KR); Hyun-Seok Kim, Daejeon (KR); Hyun-Jong Kim, Cheongju-si (KR); Ji-Hun Jeon, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 8 days.

(21) Appl. No.: 15/132,664

(22) Filed: Apr. 19, 2016

(65) Prior Publication Data
US 2016/0365923 A1    Dec. 15, 2016

(30) Foreign Application Priority Data
Jun. 9, 2015  (KR) ........................ 10-2015-0081124

(51) Int. Cl.
*H04B 10/00* (2013.01)
*H04B 10/116* (2013.01)

(52) U.S. Cl.
CPC .................. *H04B 10/116* (2013.01)

(58) Field of Classification Search
CPC .................................................. H04B 10/116
See application file for complete search history.

(56) References Cited

U.S. PATENT DOCUMENTS

| | | | | |
|---|---|---|---|---|
| 2006/0167472 A1* | 7/2006 | Hong | ..................... | A61B 90/36 606/129 |
| 2009/0002265 A1* | 1/2009 | Kitaoka | ................. | G09G 3/003 345/4 |
| 2011/0025906 A1* | 2/2011 | Shurboff | .................. | G03B 9/08 348/367 |
| 2012/0257901 A1* | 10/2012 | Yamada | ............... | H04B 10/116 398/130 |
| 2013/0188968 A1* | 7/2013 | Kim | ....................... | H04B 10/50 398/182 |

(Continued)

FOREIGN PATENT DOCUMENTS

| KR | 1020090009465 A | 1/2009 |
|---|---|---|
| KR | 1020120099074 A | 9/2012 |

(Continued)

*Primary Examiner* — Danny Leung
(74) *Attorney, Agent, or Firm* — William Park & Associates Ltd.

(57) ABSTRACT

Disclosed herein are an apparatus and method for visible light communication using electrically switchable glass. The apparatus for visible light communication using the electrically switchable glass includes a reception unit for receiving a data signal, a control unit for generating current and voltage corresponding to the data signal and controlling the transmittance of the electrically switchable glass based on the current and the voltage, and a transmission unit for adjusting the brightness of visible light that passes through the glass based on the transmittance and performing visible light communication using the visible light that has passed through the glass.

15 Claims, 7 Drawing Sheets

(56) References Cited

U.S. PATENT DOCUMENTS

| | | | | |
|---|---|---|---|---|
| 2013/0208027 A1* | 8/2013 | Bae | ............... | G09G 3/3406 345/690 |
| 2014/0161466 A1* | 6/2014 | Riza | ............... | H04B 10/1143 398/119 |
| 2014/0306609 A1* | 10/2014 | Kang | ............... | H05B 33/086 315/117 |
| 2015/0071655 A1* | 3/2015 | Tatzel | ............... | E06B 9/24 398/184 |
| 2016/0365923 A1* | 12/2016 | Kim | ............... | H04B 10/116 |

FOREIGN PATENT DOCUMENTS

| | | |
|---|---|---|
| KR | 101241074 B1 | 3/2013 |
| KR | 1020130101617 A | 9/2013 |
| KR | 1020140066258 A | 5/2014 |
| KR | 1020140146486 A | 12/2014 |
| WO | 2013049248 A2 | 4/2013 |

* cited by examiner

APPARATUS AND METHOD FOR VISIBLE LIGHT COMMUNICATION USING ELECTRICALLY SWITCHABLE GLASS

CROSS REFERENCE TO RELATED APPLICATION

This application claims the benefit of Korean Patent Application No. 10-2015-0081124, filed Jun. 9, 2015, which is hereby incorporated by reference in its entirety into this application.

BACKGROUND OF THE INVENTION

1. Technical Field

The present invention generally relates to technology for performing visible light communication. More particularly, the present invention relates to technology for performing visible light communication using electrically switchable glass and a conventional light source that is incapable of visible light communication.

2. Description of the Related Art

Conventional visible light communication could have a light source which is capable of visible light communication because modulated signals are directly applied to the light source, whereby data is transmitted to lighting output.

General lighting, which is used only to illuminate dark areas, is incapable of being used for visible light communication. Also, lighting devices that include various commonly used light sources and do not include a visible light communication function, (for example, fluorescent lamps, light bulbs, LEDs, OLEDs, metal-halide lamps, and the like), cannot perform visible light communication.

Meanwhile, electrically switchable glass is glass for adjusting brightness by controlling the light transmissivity thereof when voltage is applied thereto. Such glass is commonly known as a "smart window" or "smart glass". Generally, electrochromic glass, suspended particle device glass, and Polymer Dispersed Liquid Crystal (PDLC) glass may be used for a "smart window" or "smart glass", but without limitation to these examples, various types of electrically switchable glass may be used.

Also, the material for the so-called "smart glass" is not limited to glass. Smart glass may include glass having attached thereto synthetic resins and a material that may adjust brightness by changing the amount of light that passes through the material when voltage is applied thereto.

However, because such smart glass is merely used to adjust the amount of light output from an external light source, it cannot perform visible light communication.

Korean Patent Application Publication No. 2013-0101617 discloses technology in which a server provides additional information to a visible light communication terminal through visible light communication.

Korean Patent Application Publication No. 2013-0101617 discloses technology for turning on or off radiation of a specific frequency from a light source in order for the light source that outputs visible light to perform visible light communication, but does not disclose technology for performing visible light communication using conventional light sources which are incapable of visible light communication.

Therefore, considering that visible light communication has become more important recently and that light sources capable of visible communication are relatively expensive compared to conventional light sources which are incapable of visible light communication, it is necessary to provide technology for performing visible light communication using conventional light sources which are incapable of visible light communication.

SUMMARY OF THE INVENTION

An object of the present invention is to enable easy adjustment of the brightness of visible light in order to easily perform visible light communication.

Another object of the present invention is to realize visible light communication using a conventional light source, which cannot perform visible light communication.

A further object of the present invention is to reduce the cost of installing visible light communication equipment by using conventional light sources, which cannot perform visible light communication, without change.

In order to accomplish the above object, the present invention provides an apparatus for visible light communication using electrically switchable glass, which includes: a reception unit for receiving a data signal; a control unit for generating current and voltage corresponding to the data signal, and controlling a transmittance of the electrically switchable glass based on the current and the voltage; and a transmission unit for adjusting a brightness of visible light that passes through the glass based on the transmittance, and performing visible light communication using the visible light that has passed through the glass.

The control unit may include: a code data generation unit for generating code data by converting the data signal based on a preset rule; a modulation unit for generating a transmission signal corresponding to the data signal by modulating the code data; and a switchable circuit unit for controlling flows of current and voltage corresponding to the transmission signal by performing switching based on the transmission signal.

The electrically switchable glass may be configured such that the transmittance thereof is controlled based on whether current and voltage change in the switchable circuit unit.

The switchable circuit unit may perform switching based on the transmission signal, and may have any one of a digital logic 0 state and a digital logic 1 state as a result of performing the switching.

The transmittance of the electrically switchable glass may be lowest in the digital logic 0 state, and may be highest in the digital logic 1 state.

The transmittance of the electrically switchable glass may be highest in the digital logic 0 state, and may be lowest in the digital logic 1 state.

The control unit may further include a power control unit for delivering power to the electrically switchable glass, the code data generation unit, the modulation unit, and the switchable circuit unit.

The switchable circuit unit may have the digital logic 0 state when a bit in the transmission signal is 0, and may have the digital logic 1 state when the bit in the transmission signal is 1.

The switchable circuit unit may have the digital logic 0 state when a bit in the transmission signal is 1, and may have the digital logic 1 state when the bit in the transmission signal is 0.

Also, a method for visible light communication using electrically switchable glass according to an embodiment of the present invention includes: receiving a data signal; generating current and voltage corresponding to the data signal, and controlling a transmittance of the electrically switchable glass based on the current and the voltage; and adjusting a brightness of visible light that passes through the glass based on the transmittance, and performing visible light communication using the visible light that has passed through the glass.

Controlling the transmittance may comprise: generating code data by converting the data signal based on a preset rule; generating a transmission signal corresponding to the data signal by modulating the code data; and controlling flows of current and voltage corresponding to the transmission signal whereby a switchable circuit unit performs switching based on the transmission signal.

The electrically switchable glass may be configured such that the transmittance thereof is controlled based on whether current and voltage change in the switchable circuit unit.

Controlling the flow of the current may be configured such that switching is performed based on the transmission signal and the switchable circuit unit has any one of a digital logic 0 state and a digital logic 1 state as a result of performing the switching.

The transmittance of the electrically switchable glass may be lowest in the digital logic 0 state, and may be highest in the digital logic 1 state.

The transmittance of the electrically switchable glass may be highest in the digital logic 0 state, and may be lowest in the digital logic 1 state.

Controlling the flow of the current corresponding to the transmission signal may be configured such that the switchable circuit unit has the digital logic 0 state when a bit in the transmission signal is 0, and has the digital logic 1 state when the bit in the transmission signal is 1.

Controlling the flow of the current corresponding to the transmission signal may be configured such that the switchable circuit unit has the digital logic 1 state when a bit in the transmission signal is 0, and has the digital logic 0 state when the bit in the transmission signal is 1.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
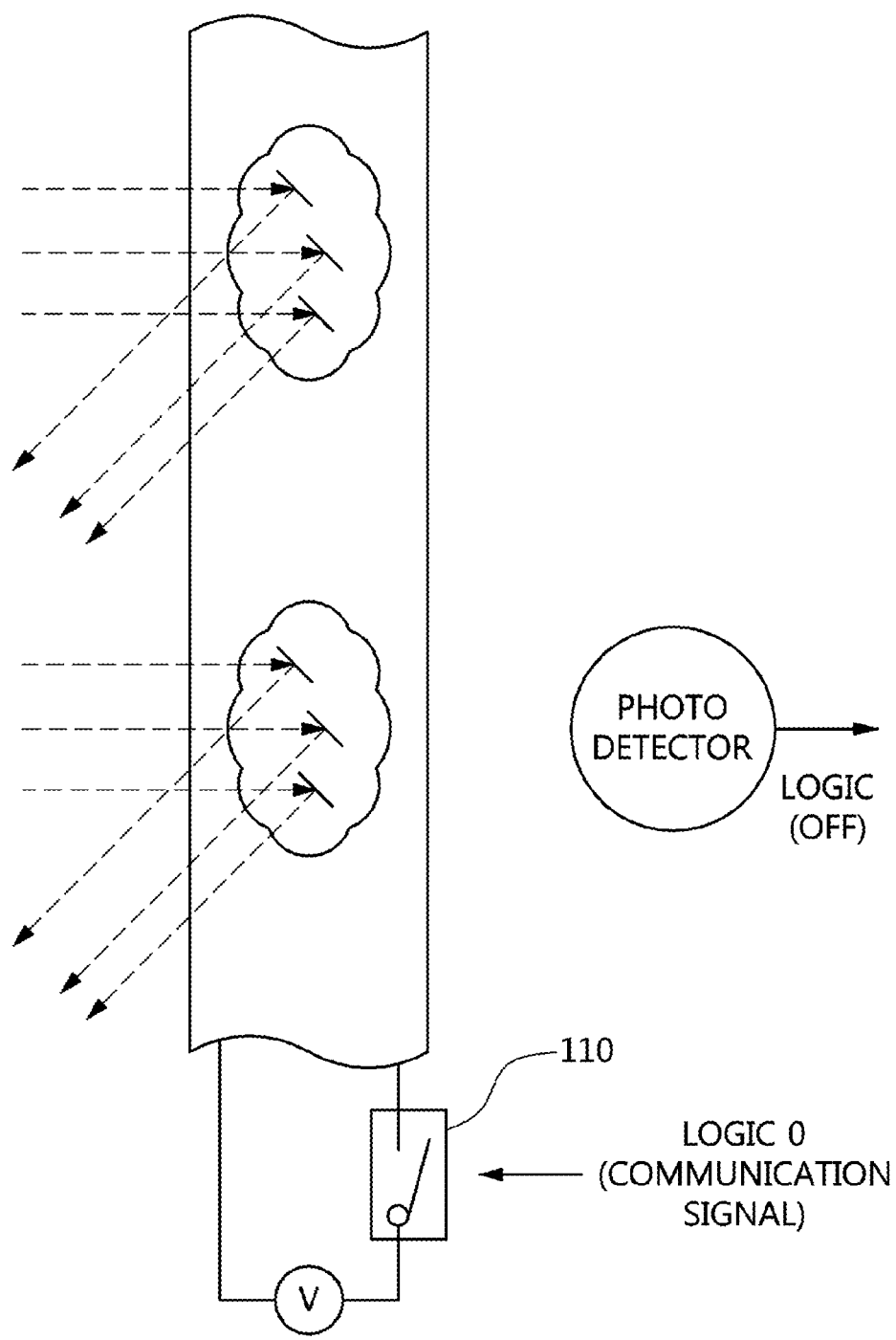
FIGS. 1 and 2 are views illustrating the principle of performing visible light communication using electrically switchable glass.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention is described in detail with reference to the accompanying drawings.

Figure 2:
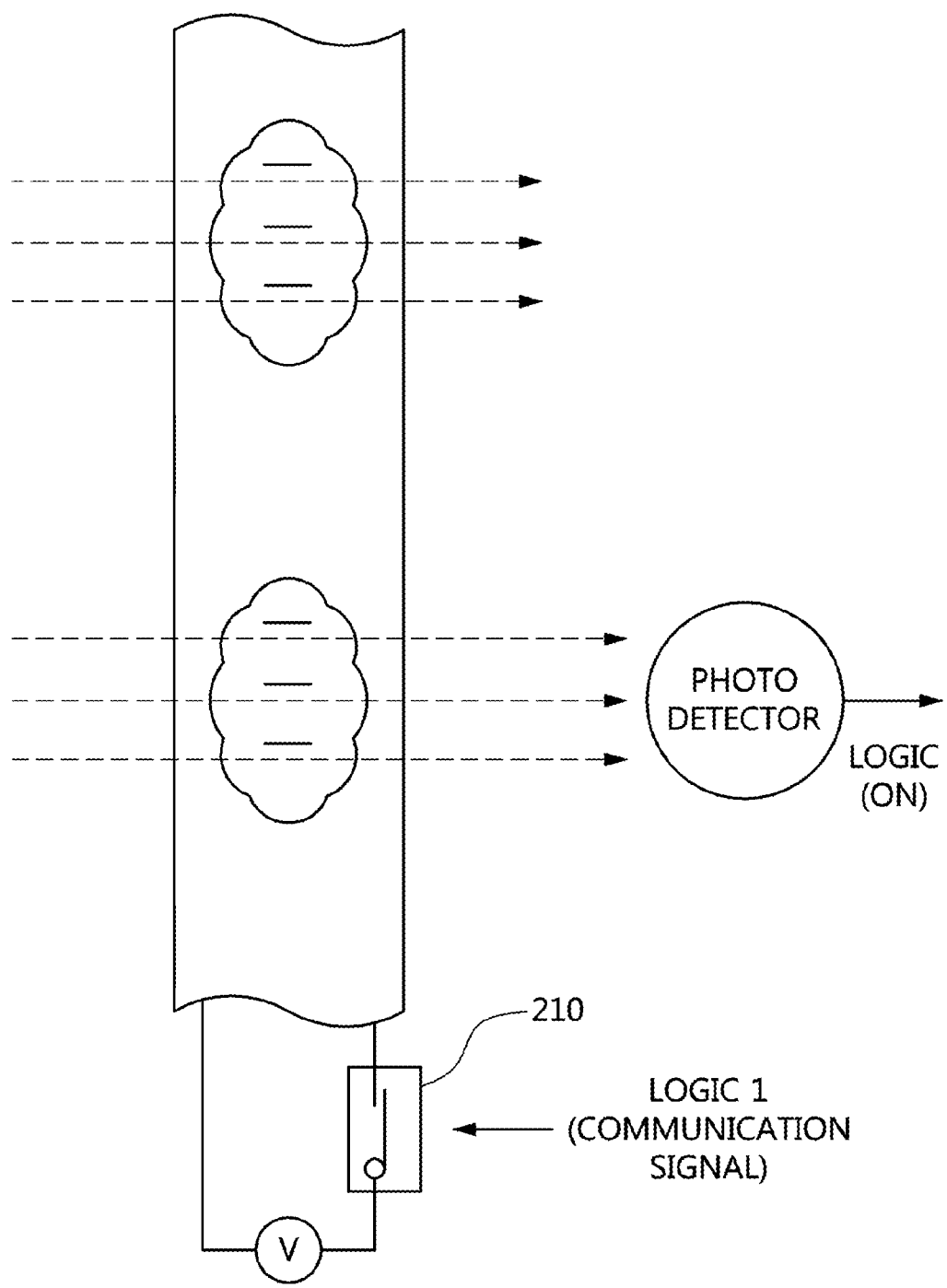

FIGS. 1 and 2 are views illustrating the principle of performing visible light communication using electrically switchable glass.

First, visible light output from a light source passes through electrically switchable glass and arrives at a photo detector. Accordingly, the photo detector performs its operation and acquires data. In visible light communication, the arrival of light is recognized as the reception of digital signal '1', whereas the non-arrival of light is recognized as the reception of digital signal '0'. For example, in order to transmit information '1001', a light source is controlled to sequentially allow the light to arrive, not to arrive, and to arrive.

In this case, visible light communication may be performed by appropriately turning on or off the light source. However, this method has a problem in that the light source must include a device for automatically turning on and off the light source.

Alternatively, there is a method in which a light source continues to output light and visible light communication is performed in such a way that the light is allowed to pass through glass so as to arrive at a photo detector (corresponding to digital signal '1') or is not allowed to pass through the glass so as not to arrive at the photo detector (corresponding to digital signal '0'). The present invention performs visible light communication using this method. Therefore, it is advantageous in that a conventional light source (which is incapable of visible light communication) may be used without change.

Referring to FIG. 1, a switchable circuit unit 110 is illustrated. When digital signal '0' arrives at the circuit unit 110, the circuit unit 110 may be switched to an open state, in which voltage is not transmitted to the glass.

Here, when voltage is not applied to the electrically switchable glass, the glass may block visible light. Therefore, the visible light may not arrive at the photo detector, which corresponds to digital signal '0'.

Referring to FIG. 2, a switchable circuit unit 210 illustrated as in the case of FIG. 1 is depicted. When digital signal '1' is transmitted to the circuit unit 210, the circuit unit 210 may be switched to a shorted state, whereby voltage may be applied to the glass.

Here, the electrically switchable glass may transmit visible light when voltage is applied thereto. Accordingly, the visible light may arrive at the photo detector, which corresponds to digital signal '1'.

For convenience of understanding, in FIGS. 1 and 2, digital signal '0' or '1' is distinguished based on whether visible light arrives at a photo detector. Alternatively, a threshold is set, and when visible light having a brightness that is higher than the threshold is received, it may be recognized as the reception of digital signal '1', whereas when visible light having a brightness that is equal to or lower than the threshold is received, it may be recognized as the reception of digital signal '0'.

Figure 3:
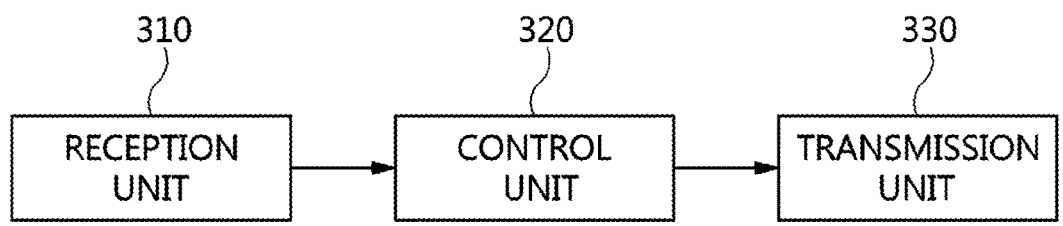
FIG. 3 is a block diagram illustrating a visible light communication apparatus using electrically switchable glass according to an embodiment of the present invention.

FIG. 3 is a block diagram illustrating a visible light communication apparatus using electrically switchable glass according to an embodiment of the present invention.

Referring to FIG. 3, the visible light communication apparatus using electrically switchable glass according to an embodiment of the present invention includes a reception unit 310, a control unit 320, and a transmission unit 330.

The reception unit 310 performs communication so as to receive the data signal to be transmitted.

The control unit 320 generates current and voltage corresponding to the data signal and controls the transmittance of the electrically switchable glass based on the current and the voltage.

Here, the control unit 320 may generate a transmission signal by converting the data signal, and may control the transmittance of the electrically switchable glass using the transmission signal.

Alternatively, the transmittance of the electrically switchable glass may be controlled based on changes in the current and voltage by performing switching using a switchable circuit unit.

For example, when data signal '1' is transmitted to the switchable circuit unit, the switchable circuit unit has a digital signal '0' state, whereas when data signal '0' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

As another example, when data signal '0' is transmitted to the switchable circuit unit, the switchable circuit unit has a digital signal '0' state, whereas when data signal '1' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

In this case, the digital signal '0' state may mean the state in which visible light having a lower intensity of illumination compared to the digital signal '1' state is transmitted. For example, the digital signal '0' state may mean the state in which visible light is completely blocked, whereby the visible light cannot be received, and the digital signal '1' state may mean the state in which all visible light is transmitted, whereby the visible light can be received.

As another example, the digital signal '0' state may mean the state in which visible light that is equal to or lower than a certain threshold is transmitted, and the digital signal '1' state may mean the state in which visible light that is higher than the certain threshold is transmitted.

In this case, the control unit 320 may control the transmittance of the glass in consideration of the brightness of the surroundings. For example, if the surroundings are bright because of light output from other light sources, when data signal '1' is received, the control unit 320 may raise the transmittance so as to increase the intensity of the visible light used for visible light communication. Also, if the surroundings are dark, when data signal '0' is received, the control unit 320 may lower the transmittance so as to decrease the intensity of the visible light used for visible light communication. The reason for this is that there is no problem in performing visible light communication when the surroundings are dark, even if the intensity of the visible light is decreased. Meanwhile, it may be desirable to decrease the intensity of the visible light because it may be hard on people's eyes if the intensity of the visible light is not decreased.

The transmission unit 330 adjusts the brightness of visible light that passes through the glass based on the transmittance and performs visible light communication using the visible light that has passed through the glass.

Here, adjusting the brightness of the visible light based on the transmittance means that the brightness of the visible light increases as more visible light passes through the glass and the brightness decreases as less visible light passes through the glass.

In this case, visible light communication may be performed such that the photo detector generates digital signal '1' when receiving visible light that has passed through the glass and generates digital signal '0' when it cannot receive visible light because there is no visible light that has passed through the glass.

Figure 4:
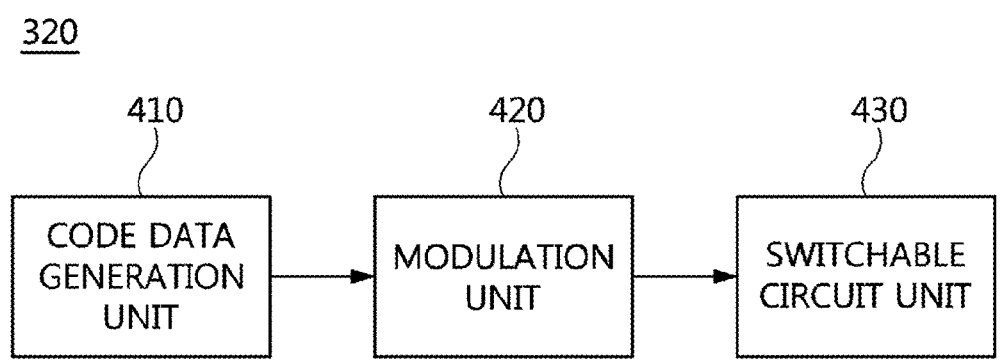
FIG. 4 is a block diagram illustrating an embodiment of the control unit illustrated in FIG. 3.

FIG. 4 is a block diagram illustrating an embodiment of the control unit 320 illustrated in FIG. 3.

Referring to FIG. 4, the control unit 320 includes a code data generation unit 410, a modulation unit 420, and a switchable circuit unit 430.

The code data generation unit 410 generates code data by converting the data signal based on a preset rule.

In this case, the code data may mean data to be transmitted, which is acquired by processing the data signal.

Here, the preset rule has no limitation. Encoding rules that are commonly used in the field of communications may be used without change.

The modulation unit 420 generates a transmission signal corresponding to the data signal by modulating the code data.

Here, there is no limitation as to the modulation method. Modulation methods used in conventional digital communications, such as On-Off Keying (OOK), Amplitude Shift Keying (ASK), Frequency Shift Keying (FSK), Phase Shift Keying (PSK), Code Division Multiple Access (CDMA), Orthogonal Frequency Division Multiplexing (OFDM), and the like, may be used to modulate the code data, whereby the transmission signal may be generated.

The switchable circuit unit 430 performs switching based on the transmission signal, and controls the flows of current and voltage corresponding to the transmission signal.

In this case, the transmittance of the electrically switchable glass may increase when the current and the voltage change, and may decrease when the current and the voltage do not change. Conversely, the transmittance of the electrically switchable glass may decrease when the current and the voltage change, and may increase when the current and the voltage do not change. Therefore, the switchable circuit unit 430 may control the transmittance of the electrically switchable glass by controlling changes in the current and voltage.

For example, when data signal '1' is transmitted to the switchable circuit unit, the switchable circuit unit has a digital signal '0' state, whereas when data signal '0' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

As another example, when data signal '0' is transmitted to the switchable circuit unit, the switchable circuit unit has a digital signal '0' state, whereas when data signal '1' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

The method described with reference to FIGS. 3 and 4 will be described again using an example in which data signal '1010' is transmitted.

First, the reception unit 310 receives data signal '1010'.

In this case, the control unit 320 generates current and voltage corresponding to the data signal '1010' and controls the transmittance of the electrically switchable glass based on the current and the voltage.

Specifically, for the first '1', the control unit 320 performs control so as to short the switchable circuit unit 430, and thus the current and voltage applied to the electrically switchable glass may change. In this case, because the transmittance of the glass increases, the transmission unit 330 may transmit the visible light that is incident on the glass, whereby the visible light is allowed to arrive at the photo detector. As the photo detector receives the visible light, it receives information corresponding to '1'.

Next, for the first '0', the control unit 320 performs control to open the switchable circuit unit 430 so as to prevent the current and voltage applied to the electrically switchable glass from changing. In this case, because the transmittance of the glass decreases, the transmission unit 320 may block the visible light that is incident on the glass, whereby the visible light is not allowed to arrive at the photo detector. Because the photo detector cannot receive the visible light, it receives information corresponding to '0'.

For the next '1', the control unit 320 performs control so as to short the switchable circuit unit 430, whereby the current and voltage applied to the electrically switchable glass may change. In this case, because the transmittance of the glass increases, the transmission unit 330 may transmit the visible light that is incident on the glass, whereby the visible light is allowed to arrive at the photo detector. As the photo detector receives the visible light, it receives information corresponding to '1'.

Subsequently, for the next '0', the control unit 320 performs control so as to open the switchable circuit unit 430 to thereby prevent the current and voltage applied to the electrically switchable glass from changing. In this case, because the transmittance of the glass decreases, the transmission unit 320 may block the visible light that is incident on the glass, whereby the visible light is not allowed to arrive at the photo detector. Because the photo detector cannot receive the visible light, it receives information corresponding to '0'.

Consequently, when the data signal '1010' is transmitted using the visible light communication apparatus that uses the electrically switchable glass, the photo detector may receive the same data signal '1010'.

Figure 5:
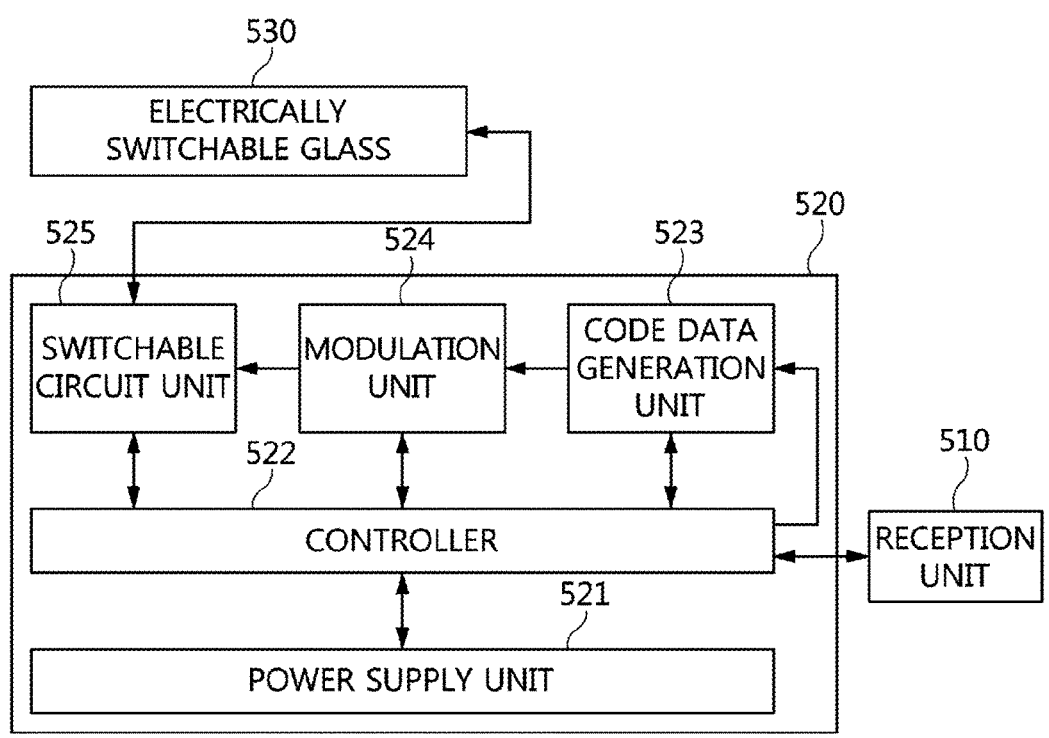
FIG. 5 is a block diagram illustrating a visible light communication apparatus using electrically switchable glass according to another embodiment of the present invention.

FIG. 5 is a block diagram illustrating a visible light communication apparatus using electrically switchable glass according to another embodiment of the present invention.

Referring to FIG. 5, the visible light communication apparatus using electrically switchable glass includes a reception unit 510, a control unit 520, and electrically switchable glass 530.

Here, the control unit 520 may include a power supply unit 521, a controller 522, a code data generation unit 523, a modulation unit 524, and a switchable circuit unit 525.

In this case, the control unit 520 may be interconnected with the electrically switchable glass 530.

The reception unit 510 receives data to be transmitted. Here, no limitations are imposed as to the data. For example, the data may be IDentification (ID) data, text data, voice data, or image data.

The power supply unit 521 supplies the controller 522 with power required for communication. The controller 522 may supply the power, supplied by the power supply unit 521, to the code data generation unit 523, the modulation unit 524, and the switchable circuit unit 525.

The controller 522 may receive data from the reception unit 510, transmit the data to the code data generation unit 523, and control the data. For example, when the amount of data that is received is greater than the amount of data that is allowed to be transmitted, the controller 522 may control the data in such a way that some of the data are temporarily stored and the remaining data are transmitted to the code data generation unit 523.

The code data generation unit 523 may process the data received from the controller 522 and transmit it to the modulation unit 524.

Here, no limitations are imposed as to the method for encoding the data. For example, conventional encoding methods, commonly used in communications, may be used without change.

The modulation unit 524 generates a transmission signal by modulating the code data received from the code data generation unit 523.

Here, the modulation unit 524 is not limited as to the method for modulating the code data. Modulation methods used in conventional digital communications, such as On-Off Keying (OOK), Amplitude Shift Keying (ASK), Frequency Shift Keying (FSK), Phase Shift Keying (PSK), Code Division Multiple Access (CDMA), Orthogonal Frequency Division Multiplexing (OFDM), and the like, may be used to modulate the code data, whereby the transmission signal may be generated.

The switchable circuit unit 525 performs switching based on the transmission signal, and controls the flows of the current and voltage corresponding to the transmission signal. Also, the switchable circuit unit 525 may supply power to the electrically switchable glass 530.

Here, the transmittance of the electrically switchable glass 530 may increase when the current and the voltage change, and may decrease when the current and the voltage do not change. Conversely, the transmittance of the electrically switchable glass 530 may decrease when the current and the voltage change, and may increase when the current and the voltage do not change. Therefore, the switchable circuit unit 525 may control the transmittance of the electrically switchable glass by controlling changes in the current and voltage.

For example, when data signal '1' is transmitted to the switchable circuit unit 525, the switchable circuit unit 525 may be open, whereas when data signal '0' is transmitted, the switchable circuit unit 525 may be shorted. Accordingly, based on whether the data signal is '1' or '0', whether or not current is flowing in the switchable circuit unit 525 may be determined, and the transmittance of the electrically switchable glass 530 may change based on whether or not the current and voltage in the switchable circuit unit 525 change.

As another example, when data signal '0' is transmitted to the switchable circuit unit 525, the switchable circuit unit 525 may be open, whereas when data signal '1' is transmitted, the switchable circuit unit 525 may be shorted. Accordingly, based on whether the data signal is '1' or '0', whether or not current is flowing in the switchable circuit unit 525 may be determined, and the transmittance of the electrically switchable glass 530 may change based on whether or not the current and voltage in the switchable circuit unit 525 change.

In the case of the electrically switchable glass 530 illustrated in FIG. 5, the transmittance increases when the current and the voltage change, and decreases when the current and the voltage do not change. However, without limitation to the above example, those skilled in the art may understand that the present invention may be applied to electrically switchable glass 530 of which the transmittance decreases when the current and the voltage change and increases when the current and the voltage do not change.

The present invention described with reference to FIG. 5 is not limited as to the light source. In other words, the present invention may be applied to commonly used light bulbs, fluorescent lamps, LEDs, and the like, which have not been able to perform visible light communication because they cannot receive data signals or determine on/off states thereof based on data signals, because the present invention controls the brightness of the visible light output from these light sources using the electrically switchable glass.

Figure 6:
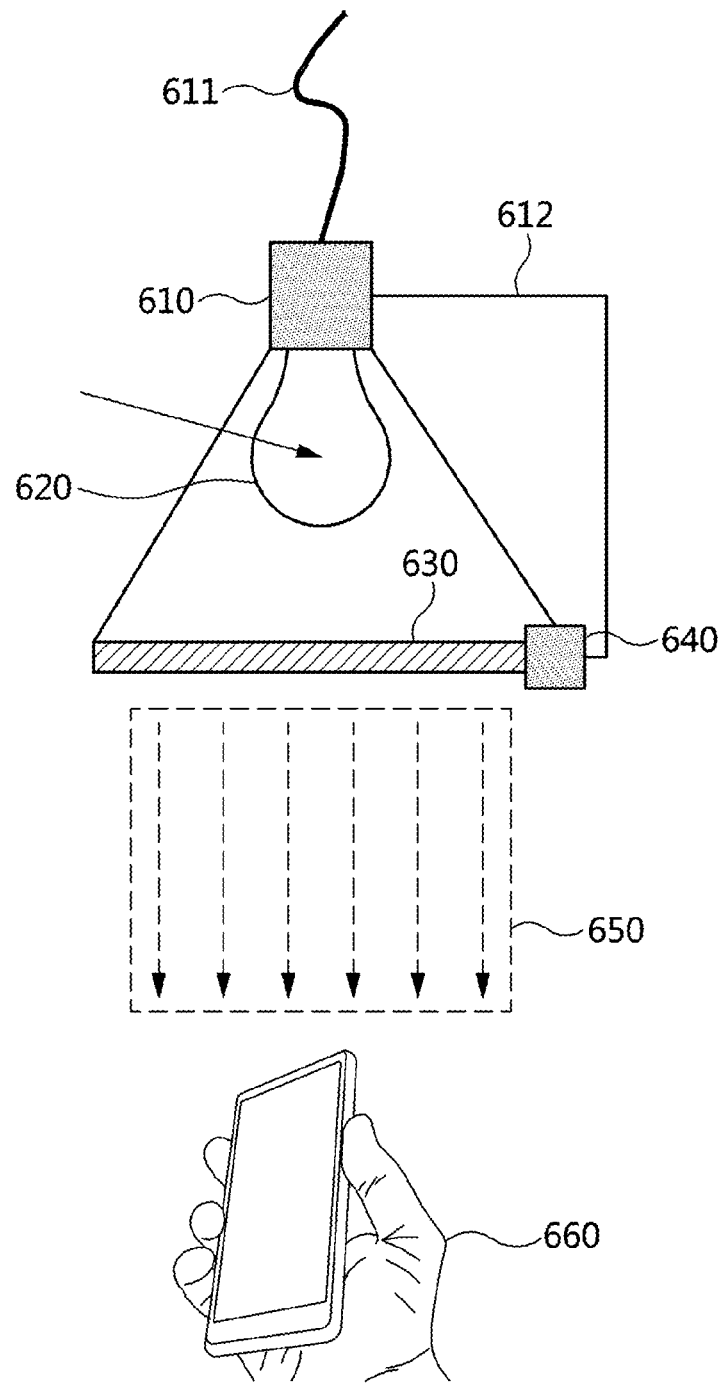
FIGS. 6 and 7 are views illustrating an example in which visible light communication is performed using a visible light communication apparatus that uses electrically switchable glass according to an embodiment of the present invention.
Figure 7:
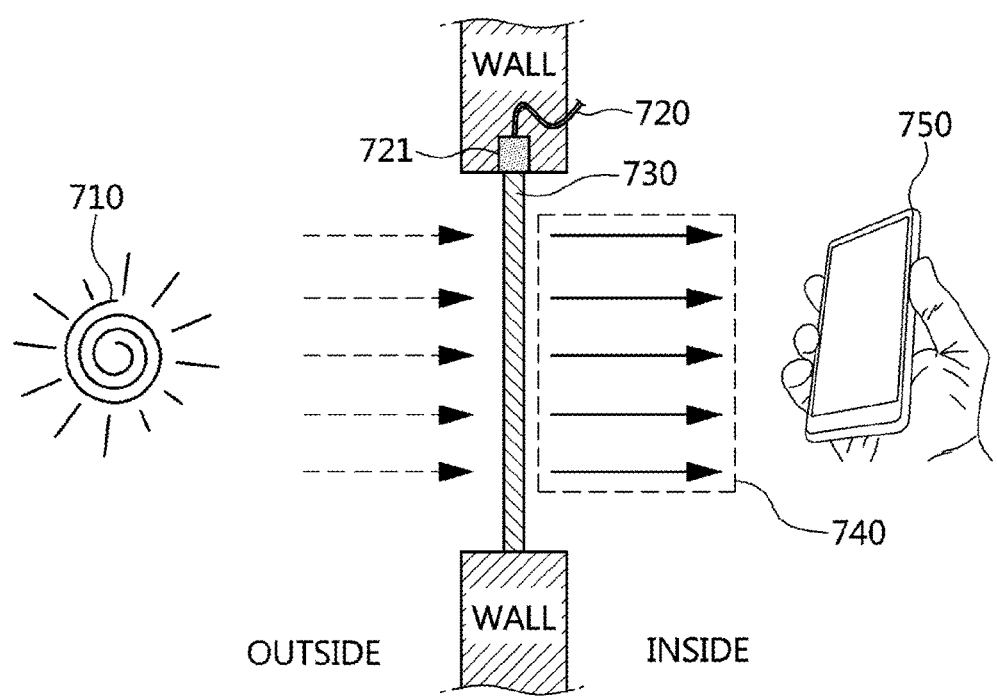

FIGS. 6 and 7 are views illustrating an example in which visible light communication is performed using the visible light communication apparatus that uses electrically switchable glass according to an embodiment of the present invention.

FIG. 6 is a view illustrating an example in which visible light communication is performed using a conventional light source (which is incapable of visible light communication) and the visible light communication apparatus that uses electrically switchable glass according to an embodiment of the present invention. Referring to FIG. 6, a visible light communication apparatus using electrically switchable glass, a light source 620, and a photo detector 660 are illustrated.

The visible light communication apparatus using the electrically switchable glass includes a power control unit 610, power cables 611 and 612, electrically switchable glass 630, and a control unit 640.

The power control unit 610 receives power through the power cable 611 and supplies the power to the control unit 640 through the power cable 612.

In this case, the visible light output from the light source 620 arrives at the electrically switchable glass 630, and the brightness thereof is adjusted based on the transmittance, which is controlled by the visible light communication apparatus using the electrically switchable glass according to the present invention, whereby a modulated signal 650 is output.

In this case, the photo detector 660 may receive the modulated signal 650 and acquire data by decoding the modulated signal.

Here, there is no limitation as to the kind of light source 620. It is possible to use commonly used light bulbs, fluorescent lamps, LEDs, and the like, which have not been able to perform visible light communication because they cannot receive data signals or determine on/off states thereof based on data signals, because the present invention may control the brightness of the visible light output from the light source using the electrically switchable glass.

FIG. 7 is a view illustrating an example in which sunlight or natural light is used as a light source and visible light communication is performed using a visible light communication apparatus that uses electrically switchable glass according to an embodiment of the present invention.

Referring to FIG. 7, an external light source 710 is present, and the visible light output from the light source 710 passes through the electrically switchable glass, which is installed in a wall, like a window.

In this case, the control unit 720 may control the transmittance of the electrically switchable glass based on the data signal, and the brightness of the visible light, output from the light source 710, is adjusted to correspond to the data signal, whereby the visible light may be converted into a modulated signal 740.

The modulated signal 740 arrives at the photo detector 750, and is converted into a data signal by being decoded in the photo detector 750, whereby the data signal may be received.

Here, there is no limitation as to the kind of light source 710. Not only commonly used light bulbs, fluorescent lamps, and LEDs, but also visible light from the sun and outdoor lighting (for example, street lamps, security lights, and outdoor landscape lighting) may be used to perform visible light communication.

As illustrated in FIG. 7, the visible light communication apparatus using the electrically switchable glass according to an embodiment of the present invention may be used in the form of a window.

Figure 8:
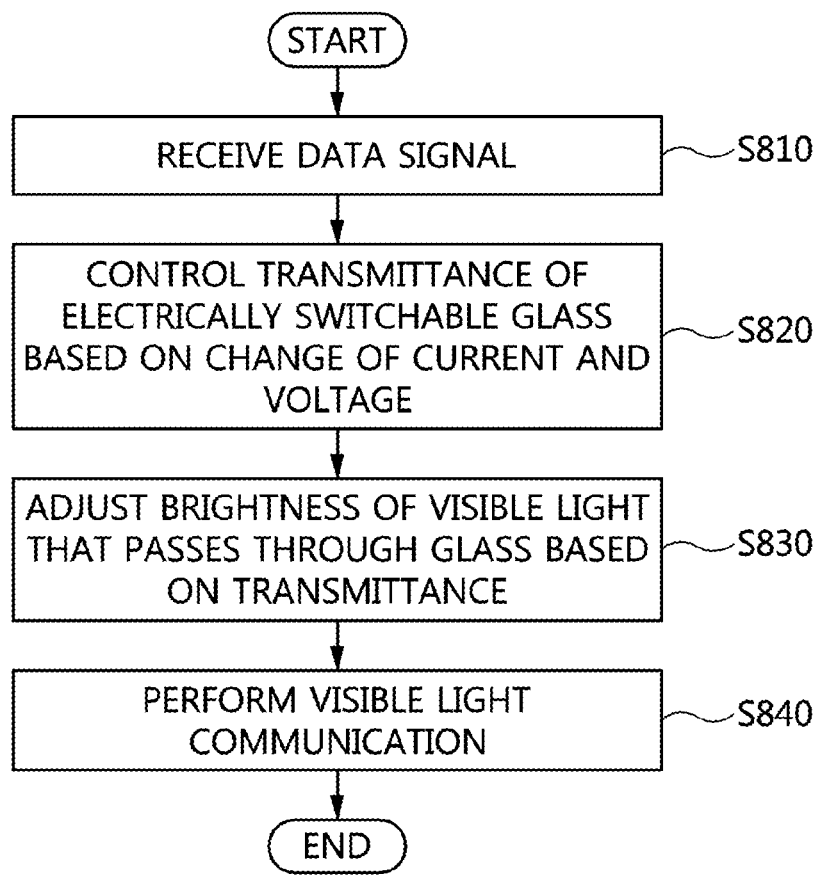
FIG. 8 is a flowchart illustrating a visible light communication method using electrically switchable glass according to an embodiment of the present invention.

FIG. 8 is a flowchart illustrating a visible light communication method using electrically switchable glass according to an embodiment of the present invention.

Referring to FIG. 8, first, a data signal is received at step S810.

Also, current and voltage corresponding to the data signal are generated, and the transmittance of electrically switchable glass is controlled based on the current and the voltage at step S820.

In this case, a transmission signal may be generated by converting the data signal received at step S810, and the transmittance of the electrically switchable glass may be controlled using the transmission signal.

Here, the transmittance of the electrically switchable glass may be controlled based on changes in the current and voltage by performing switching using a switchable circuit unit.

For example, when data signal '1' is transmitted to the switchable circuit unit, the switchable circuit unit has a digital signal '0' state, whereas when data signal '0' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

As another example, when data signal '0' is transmitted to the switchable circuit unit, the switchable circuit unit has a digital signal '0' state, whereas when data signal '1' is transmitted, the switchable circuit unit has a digital signal '1' state. Accordingly, based on whether the data signal is '1' or '0', whether or not current is flowing in the switchable circuit unit may be determined, and the transmittance of the electrically switchable glass may change based on whether or not current is flowing in the switchable circuit unit.

In this case, the digital signal '0' state may mean the state in which visible light having a lower intensity of illumination compared to the digital signal '1' state is transmitted. For example, the digital signal '0' state may mean the state in which visible light is completely blocked, whereby the visible light cannot be received, and the digital signal '1' state may mean the state in which all visible light is transmitted, whereby the visible light can be received.

As another example, the digital signal '0' state may mean the state in which visible light that is equal to or lower than a certain threshold may be transmitted, and the digital signal '1' state may mean the state in which visible light that is higher than the certain threshold may be transmitted.

In this case, the transmittance of the glass may be controlled in consideration of the brightness of the surroundings. For example, if the surroundings are bright because of light output from other light sources, when data signal '1' is received, the transmittance may be raised so as to increase the intensity of the visible light used for visible light communication. In contrast, if the surroundings are dark, when data signal '0' is received, the transmittance may be lowered so as to decrease the intensity of visible light used for visible light communication. The reason for this is that when the surroundings are dark, there is no problem in performing visible light communication even if the intensity of the visible light is decreased. Meanwhile, it may be desirable to decrease the intensity of the visible light because it may be hard on people's eyes if the intensity of the visible light is not decreased.

Also, the brightness of visible light that passes through the glass is adjusted based on the transmittance at step S830, and visible light communication is performed at step S840 using the visible light that has passed through the glass.

Here, the adjusting the brightness of the visible light based on transmittance means that the brightness of the visible light increases as more visible light passes through the glass and the brightness decreases as less visible light passes through the glass.

In this case, visible light communication may be performed such that the photo detector generates digital signal '1' when receiving visible light that has passed through the glass and generates digital signal '0' when it cannot receive visible light because there is no visible light that has passed through the glass.

The present invention may easily perform visible light communication because it may control both the brightness of visible light and communication signals using electrically switchable glass.

Also, the present invention may perform visible light communication even if it uses a conventional light source that cannot perform visible light communication.

Also, because the present invention uses conventional light sources, which cannot conventionally be used to perform visible light communication, without change, the cost of installing visible light communication equipment may be reduced.

As described above, the apparatus and method for visible light communication using electrically switchable glass according to the present invention are not limitedly applied to the configurations and operations of the above-described embodiments, but all or some of the embodiments may be selectively combined and configured so that the embodiments may be modified in various ways. The scope of the present invention should be defined by the technical spirit of the claims.

What is claimed is:

1. An apparatus for visible light communication using electrically switchable glass, comprising:
    a reception unit for receiving a data signal;
    a control unit for generating current and voltage corresponding to the data signal, and controlling a transmittance of the electrically switchable glass based on the current and the voltage; and
    a transmission unit for adjusting a brightness of visible light that passes through the glass based on the transmittance, and performing visible light communication using the visible light that has passed through the glass,
    wherein the control unit comprises:
        a code data generation unit for generating code data by converting the data signal based on a preset rule;
        a modulation unit for generating a transmission signal corresponding to the data signal by modulating the code data; and
        a switchable circuit unit for controlling flows of current and voltage corresponding to the transmission signal by performing switching based on the transmission signal.

2. The apparatus of claim 1, wherein the electrically switchable glass is configured such that the transmittance thereof is controlled based on whether current and voltage change in the switchable circuit unit.

3. The apparatus of claim 2, wherein the switchable circuit unit performs switching based on the transmission signal, and has any one of a digital logic 0 state and a digital logic 1 state as a result of performing the switching.

4. The apparatus of claim 3, wherein the transmittance of the electrically switchable glass is lowest in the digital logic 0 state, and is highest in the digital logic 1 state.

5. The apparatus of claim 3, wherein the transmittance of the electrically switchable glass is highest in the digital logic 0 state, and is lowest in the digital logic 1 state.

6. The apparatus of claim 3, wherein the control unit further comprises a power control unit for delivering power to the electrically switchable glass, the code data generation unit, the modulation unit, and the switchable circuit unit.

7. The apparatus of claim 4, wherein the switchable circuit unit has the digital logic 0 state when a bit in the transmission signal is 0, and has the digital logic 1 state when the bit in the transmission signal is 1.

8. The apparatus of claim 5, wherein the switchable circuit unit has the digital logic 0 state when a bit in the transmission signal is 1, and has the digital logic 1 state when the bit in the transmission signal is 0.

9. A method for visible light communication using electrically switchable glass, comprising:
    receiving a data signal;
    generating current and voltage corresponding to the data signal, and controlling a transmittance of the electrically switchable glass based on the current and the voltage; and
    adjusting a brightness of visible light that passes through the glass based on the transmittance, and performing visible light communication using the visible light that has passed through the glass,
    wherein controlling the transmittance comprises:
        generating code data by converting the data signal based on a preset rule;
        generating a transmission signal corresponding to the data signal by modulating the code data; and
        controlling flows of current and voltage corresponding to the transmission signal whereby a switchable circuit unit performs switching based on the transmission signal.

10. The method of claim 9, wherein the electrically switchable glass is configured such that the transmittance thereof is controlled based on whether current and voltage change in the switchable circuit unit.

11. The method of claim 10, wherein controlling the flow of the current is configured such that switching is performed based on the transmission signal and the switchable circuit unit has any one of a digital logic 0 state and a digital logic 1 state as a result of performing the switching.

12. The method of claim 11, wherein the transmittance of the electrically switchable glass is lowest in the digital logic 0 state, and is highest in the digital logic 1 state.

13. The method of claim 11, wherein the transmittance of the electrically switchable glass is highest in the digital logic 0 state, and is lowest in the digital logic 1 state.

14. The method of claim 12, wherein controlling the flow of the current corresponding to the transmission signal is configured such that the switchable circuit unit has the digital logic 0 state when a bit in the transmission signal is 0, and has the digital logic 1 state when the bit in the transmission signal is 1.

15. The method of claim 13, wherein controlling the flow of the current corresponding to the transmission signal is configured such that the switchable circuit unit has the digital logic 1 state when a bit in the transmission signal is 0, and has the digital logic 0 state when the bit in the transmission signal is 1.

* * * * *